US006983603B2

(12) United States Patent
Macchia

(10) Patent No.: US 6,983,603 B2
(45) Date of Patent: Jan. 10, 2006

(54) DETECTION OF GAS TURBINE ENGINE HOT SECTION CONDITION

(75) Inventor: Enzo Macchia, Kleinburg (CA)

(73) Assignee: Pratt & Whitney Canada Corp., Longueuil (CA)

( * ) Notice: Subject to any disclaimer, the term of this patent is extended or adjusted under 35 U.S.C. 154(b) by 238 days.

(21) Appl. No.: 10/278,897

(22) Filed: Oct. 24, 2002

(65) Prior Publication Data

US 2004/0079070 A1 Apr. 29, 2004

(51) Int. Cl.
*F02C 9/00* (2006.01)
*F02C 9/28* (2006.01)

(52) U.S. Cl. .................................... 60/772; 60/39.281

(58) Field of Classification Search ................... 60/772, 60/39.281, 238
See application file for complete search history.

(56) References Cited

U.S. PATENT DOCUMENTS 3,030,575 A * 4/1962 Bockemuehl et al. ........ 324/537
3,255,586 A * 6/1966 Hennig et al. ................ 60/773
3,946,364 A 3/1976 Codomo et al.
4,058,975 A * 11/1977 Gilbert et al. ........... 60/39.281
4,185,460 A 1/1980 Moore et al.
4,406,550 A 9/1983 Gray
4,583,360 A * 4/1986 Nick ........................... 60/773
4,738,098 A 4/1988 McMahon
5,024,055 A 6/1991 Sato et al.
5,148,667 A * 9/1992 Morey ......................... 60/779
5,307,633 A 5/1994 Koerner et al.
5,369,951 A 12/1994 Corbett et al.
5,388,396 A 2/1995 Koerner et al.
5,479,350 A 12/1995 Barakchi et al.
5,540,045 A 7/1996 Corbett et al.
5,720,164 A 2/1998 Corbett et al.
5,812,588 A * 9/1998 Deak et al. ................. 374/166
5,826,602 A 10/1998 Chen
6,003,296 A * 12/1999 Citeno et al. ................. 60/772
6,353,790 B1 * 3/2002 Tsuzuki ........................ 60/238

FOREIGN PATENT DOCUMENTS

EP 1 239 131 A2 9/2002
EP 1 251 258 A2 10/2002
GB 749598 5/1956
GB 2 219 070 A 11/1989

* cited by examiner

*Primary Examiner*—Ted Kim
(74) *Attorney, Agent, or Firm*—Ogilvy Renault

(57) ABSTRACT

A system and a method for detecting gas turbine engine hot section condition using temperature measurements during engine operation. The system comprises a sensing unit for sensing a temperature distribution across a hot combustion gas stream generated by a gas turbine engine combustor. A signal processor receives temperature signals from the sensing unit and generates a combustor malfunction signal when the difference between a maximal temperature and a minimal temperature of the sensed temperature distribution is greater than a predetermined acceptable delta value.

19 Claims, 4 Drawing Sheets

DETECTION OF GAS TURBINE ENGINE HOT SECTION CONDITION

BACKGROUND OF THE INVENTION

1. Field of the Invention

The present invention generally relates to gas turbine engines and, more particularly, to a system and a method for monitoring the operational condition of a gas turbine engine. The invention also relates, more generally, to a method for monitoring and detecting changes within a system.

2. Description of the Prior Art

Over time, fuel nozzles of gas turbine engines are known to develop deposits, herein referred to as coke, in the fuel passage proximate the engine combustor. Streaking fuel nozzles and/or blocked fuel nozzles due to coking can result in premature hot end distress (turbine blades creeping, blade ruptures, and thermal disparity). Sometimes, over-temperatured vanes can fracture resulting in surge (among other things). As a result, fuel injection nozzles are periodically removed from the engine and subject to a cleaning operation to remove the coke deposits from the fuel passages. However, this time-maintenance approach, whereby the fuel nozzles are cleaned at regular time intervals, does not accommodate variations in the rate at which a fuel nozzle can get clogged for individual engines. As a result, the fuel nozzles in many engines are often cleaned even though they still operate satisfactorily, in one extreme, or, in the other extreme, at a time well beyond when they became clogged, resulting in possible damage to the engine.

Therefore, it would be highly desirable to have an on-going monitoring system and method that could be used to determine when the fuel nozzles of a gas turbine engine need to be cleaned, or otherwise maintained or replaced, thereby providing the operator with more economic maintenance periods, while still protecting against engine part failure due to hot end distress.

SUMMARY OF THE INVENTION

It is therefore an aim of the present invention to provide on-going monitoring system for providing gas turbine engine component condition feedback.

It is also an aim of the present invention to provide a simple method for monitoring the condition of certain hot end components in a gas turbine engine.

Therefore, in accordance with the present invention, there is provided a system for providing gas turbine engine condition feedback, comprising: a sensing assembly for sensing a temperature at a plurality of locations in a gas stream of a gas turbine engine and for generating a plurality of temperature signals corresponding to the temperatures sensed at the plurality of locations, the sensed temperatures providing a temperature distribution profile of the gas stream, a signal processor assembly for receiving and comparing the plurality of temperature signals from the sensing assembly, and for generating a warning signal when the difference between a maximum temperature and a minimum temperature is greater than a predetermined acceptable delta value, and an alert indicator assembly for alerting a human upon receiving a warning signal from the signal processor assembly.

In accordance with a further general aspect of the present invention, there is provided a method for monitoring the condition of a hot end component of a gas turbine engine, comprising the steps of: a) sensing a temperature distribution in at least a portion of a gas path in a gas turbine engine, and b) generating an alert signal when an unacceptably non-uniform temperature distribution is detected.

In accordance with a still further general aspect of the present invention, there is provided a gas turbine engine comprising: a compressor section, a combustor section, a plurality of fuel nozzles for delivering pressurized fuel to the combustor section wherein the fuel is ignited for generating a stream of hot combustion gases, a turbine section for extracting energy from the combustion gases; and a combustor malfunction detection system, the system including a first set of temperature sensors located in the hot gas stream for sensing an inter-turbine temperature (ITT) distribution, and a signal processor receiving a temperature signal from each of said temperature sensors for determining a delta of temperature between minimum and maximum sensed temperatures and for generating a combustor malfunction signal when the delta of temperature is greater than a predetermined acceptable value.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
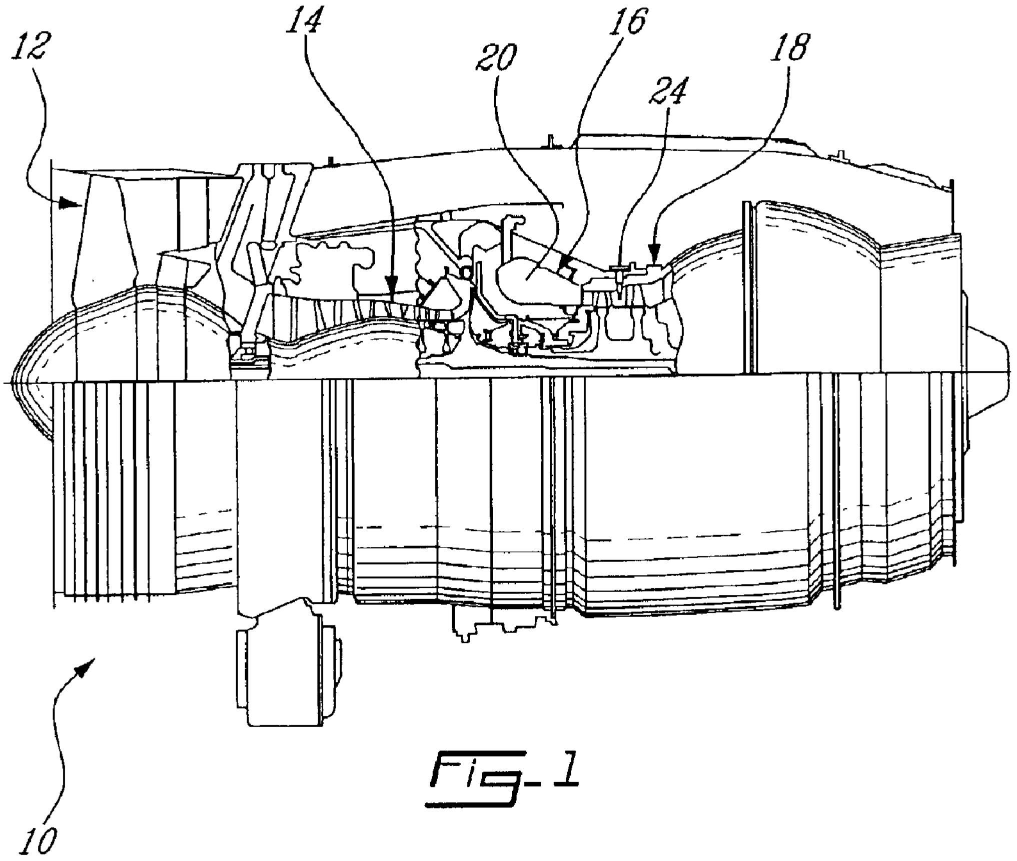
FIG. 1 is a side view, partly broken away, of a gas turbine engine to which an embodiment of the present invention is applied.

FIG. 1 illustrates a gas turbine engine 10 according to one embodiment of the present invention, the gas turbine engine generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases and a turbine 18 for extracting energy from the combustion gases.

The combustor 16 typically comprises a combustion chamber 20 and a plurality of fuel nozzles (not shown), which are typically equally spaced about the combustion chamber 20 in order to permit a substantially uniform temperature distribution in the combustion chamber 20 to be maintained. In use, fuel is provided to the combustion chamber 20 by the fuel nozzles for ignition therein, and the expanding gases caused by the fuel ignition drives the turbine 18 in a manner well known in the art.

During extended periods of engine operation, however, the fuel flowing through the fuel nozzles can carbonize or coke. Such coking can clog the nozzles and prevent the nozzles from spraying properly, thereby giving rise to a non-uniform combustor exit temperature distribution, which results in high thermal stresses in the combustor and the turbine parts of the engine. As is well know thermal stresses of this sort are undesirable and may subject engine parts in the combustor and/or turbine ("hot end parts") to premature thermal distress.

The present invention recognizes that fuel nozzle condition and performance in a gas turbine engine can be directly monitored by monitoring temperature differentials in the combustion zone and downstream thereof, as described in more detail below. Therefore, according to one embodiment of the present invention, the temperature distribution of the hot section is to be measured and monitored to monitor the "health" of the fuel nozzles, as will now be described.

Figure 2:
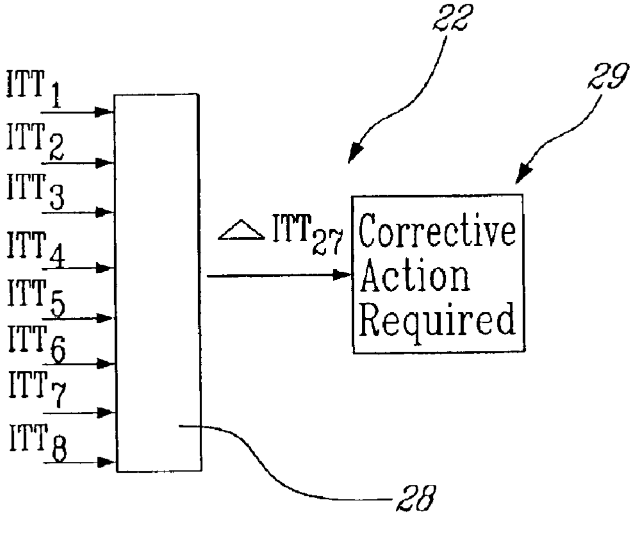
FIG. 2 is a block diagram of a system for providing gas turbine engine combustor condition feedback in accordance with a preferred embodiment of the invention.
Figure 4:
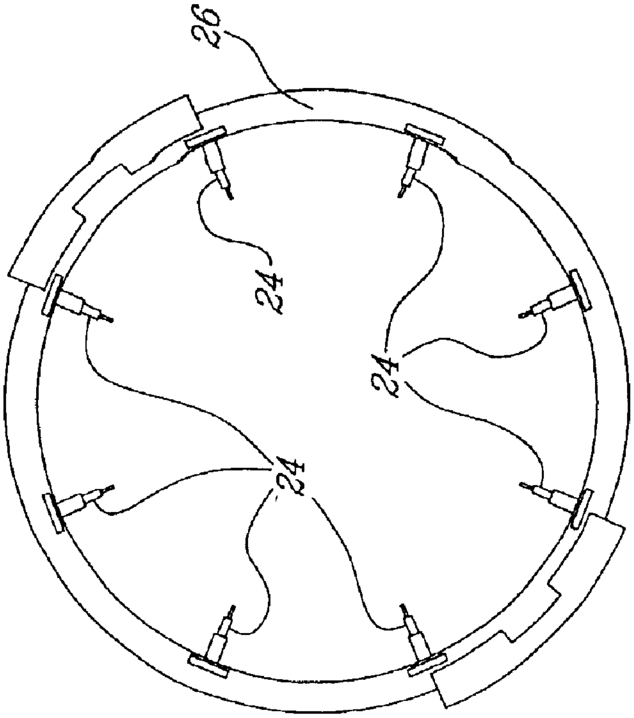
FIG. 4 is a schematic rear end view of the thermocouple arrangement of the system shown in FIG. 2.
Figure 3:
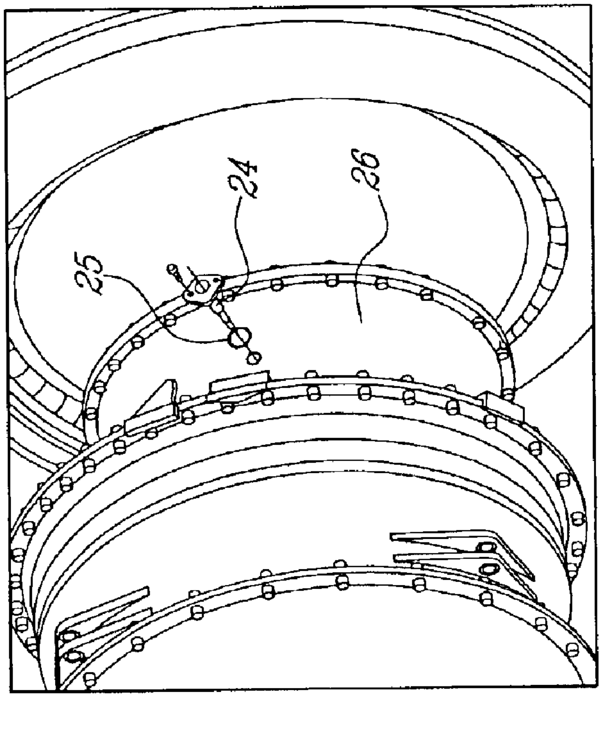
FIG. 3 is an enlarged perspective view of the turbine section of the gas turbine engine shown in FIG. 1 and illustrating how a set of circumferentially spaced-apart thermocouples, forming part of the system shown in FIG. 2, are mounted to the engine casing to measure the inter-turbine temperature (ITT) distribution.

As shown schematically in FIG. 2, the "health" of the fuel nozzles may be monitored on an on-going basis by a monitoring system 22. According to a preferred embodiment of the present invention, the monitoring system 22 comprises a plurality (there are eight in the illustrated embodiment, though more or less may be used) of circumferentially spaced-apart inter-turbine temperature (ITT) sensors or thermocouples 24 (FIG. 4) projecting into the hot combustion gas stream for providing temperature signals $ITT_1$, $ITT_2$, $ITT_3$, $ITT_4$, $ITT_5$, $ITT_6$, $ITT_7$ and $ITT_8$. The sensors 24 are preferably positioned and arranged such that, together, they provide temperature information which is indicative of the combustor exit temperature distribution. The sensors 24 are preferably provided in the form of thermocouples mounted in circumferentially spaced-apart receiving holes 25 defined in the turbine casing 26 (FIGS. 3 and 4). According to the illustrated embodiment, the temperature sensors 24 are equally spaced in an annular planar array between the two first stages of turbine blades.

As shown in FIG. 2, the temperature signals $ITT_1$, $ITT_2$ $ITT_3$, $ITT_4$, $ITT_5$, $ITT_6$, $ITT_7$ and $ITT_8$ are received by a signal processor 28 in communication with the sensors 24. The signal processor 28 is operative to process the temperature signals and to provide a feedback on the condition of the combustor 16 based on the temperature distribution at the exit of the combustor 16. More particularly, the signal processor 28 computes the temperature differential between each sensor, and between the minimum and the maximum sensed temperatures. For the sake of description herein, in the illustrated embodiment the maximum and minimum temperatures have been respectively sensed at sensors "2" and "7". The calculated temperature differential, referred to herein as delta $ITT_{27}$, is then compared by the processor 28 with a predetermined acceptable delta value. If the computed delta $ITT_{27}$ is greater than the predetermined acceptable delta value, the combustor exit temperature distribution is considered sufficiently non-uniform to warrant warning the operator, and so then a malfunction signal is generated by the processor 28. An alert indicator 29 is provided for alerting the operator upon receiving a warning signal from the processor 28. A large temperature differential between measurement locations could be an indication of a "hot spot" caused by a clogged fuel nozzle, and thus may be an indication that maintenance is required. The present invention thus provides the operator with an indication that a corrective action (e.g. fuel nozzle maintenance) has to be taken before an engine part (e.g. the combustor) is damaged due to excessive thermal stresses resulting from a maintenance condition (e.g. a clogged fuel nozzle). As such, the use of the on-board monitoring system 22 according to the present invention may permit the detection of even partial nozzle clogging, thereby allowing an operator to take corrective measures before significant thermal damage is incurred.

Figure 5B:
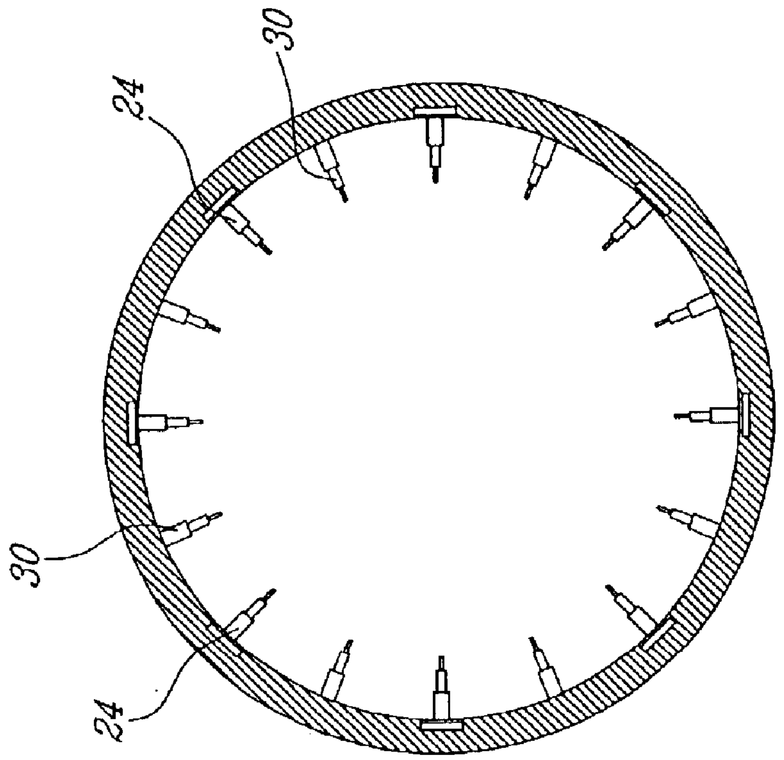
FIG. 5*b* is a schematic rear end view of the gas turbine engine section shown FIG. 5*a*.
Figure 5A:
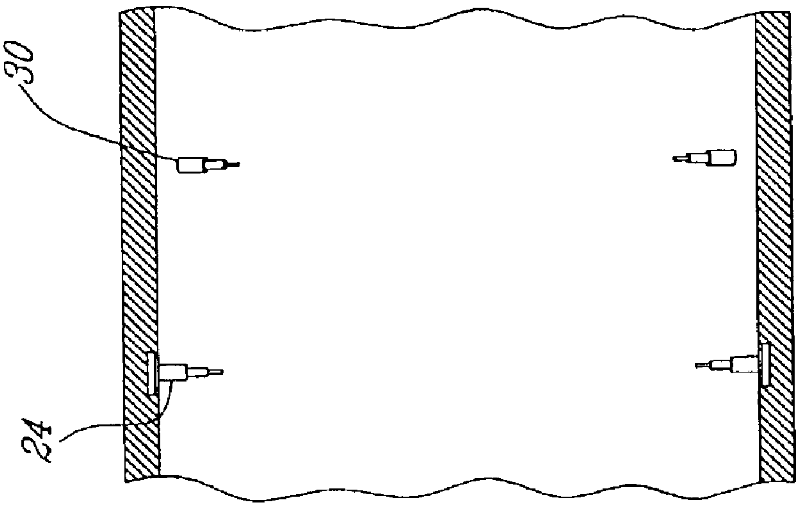
FIG. 5*a* is a schematic side view of a section of the gas turbine engine wherein two sets of sensors are longitudinally spaced apart in a gas path.

According to a further aspect of the present invention, shown in FIGS. 5*a* and 5*b*, a second set of circumferentially spaced-apart temperature sensors 30 may be installed downstream of the first annular array of temperature sensors 24 to provide additional points of measurement along the gas path. It is understood that more than two longitudinally spaced-apart sets of sensors could be provided. As shown in FIG. 5*b*, the second array of sensors 30 may be angularly offset relative to the first array of sensors 24.

Figure 6:
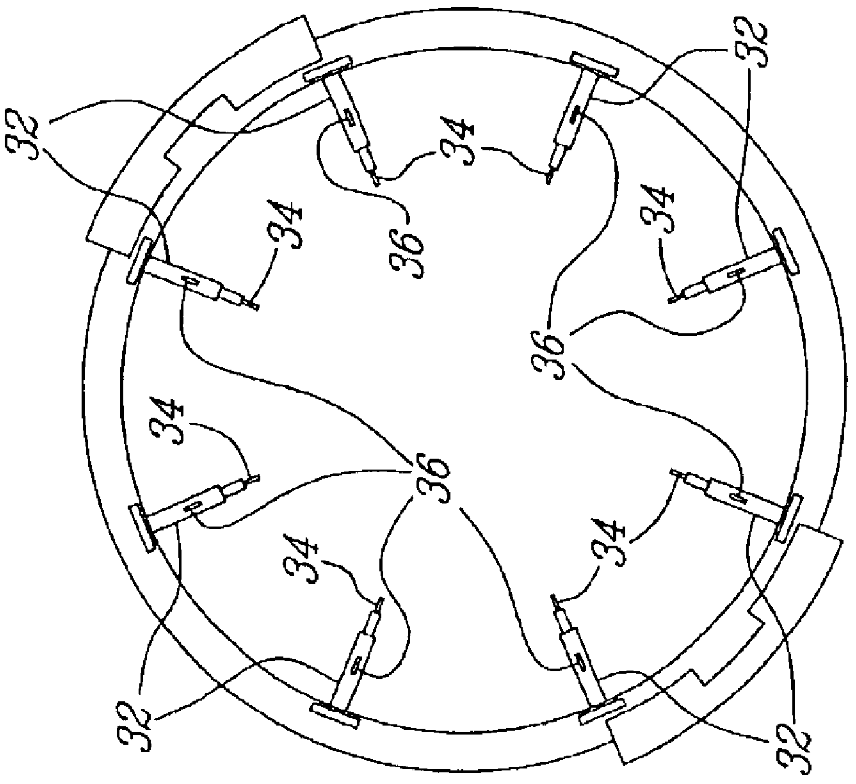
FIG. 6 is a schematic rear end view of a gas turbine engine section in accordance with a further embodiment of the present invention.

Alternately, as shown in FIG. 6, the monitoring system 22 could be provided with a temperature sensing unit including a number of circumferentially spaced-apart probes 32, each probe 32 having a number of radially spaced-apart thermocouples 34 and 36 mounted thereon for sensing the temperature distribution on different concentric circles across a transversal plane of the stream of combustion gases.

It is also noted that other types of temperature distribution sensing measuring device could be used (in place of thermocouples) for measuring the temperature spread in and downstream of the combustor 16. For instance, sensing units such as optical time domain reflectometry or infrared type temperature devices may also be used. One skilled in the art may recognize that other sensor locations and arrangements may also be used in connection with the present invention.

As apparent from the above description, the on-going monitoring system and method according to the present invention can be applied to various types of gas turbine engine to obtain real-time hot section feedback and, thus, determine when maintenance is likely actually required, rather than rely on predictions as to the appropriate interval between maintenance operations. This may permit the operator to achieve a more economic operation of the engine(s), since maintenance will be conducted only when indicated as necessary, rather than at a pre-determined specified period. The monitoring system of the present invention advantageously permits improvements to be realized in engine reliability and may reduce premature engine distress. Another advantage of the present invention is that it can be readily applied to new engines as well as to those in the field, with only minimal modification to the engine and associated controls. In this regard, the system could be offered in the form of a retrofit package including a temperature distribution measuring device, a signal processor and the mounting hardware.

What is claimed is:

1. A system for providing gas turbine engine condition feedback, comprising:

a sensing assembly for sensing a temperature at a plurality of locations in a gas stream of a gas turbine engine and for generating a plurality of temperature signals corresponding to the temperatures sensed at the plurality of locations, the sensed temperatures providing a temperature distribution profile of the gas stream, a signal processor assembly for receiving and comparing the plurality of temperature signals from the sensing assembly, and for generating a warning signal that maintenance is required when the difference between a maximum temperature and a minimum temperature is greater than a predetermined acceptable delta value, the signal processor being configured to generate the warning signal solely on the basis of the difference between the maximum and minimum temperatures, and an alert indicator assembly for alerting a human upon receiving a warning signal from the signal processor assembly.

2. A system as defined in claim 1, wherein said sensing assembly is adapted to sense the inter-turbine temperature (ITT) of the gas turbine engine.

3. A system as defined in claim 1, wherein said sensing assembly includes a first annular array of a plurality of circumferentially spaced-apart temperature sensors.

4. A system as defined in claim 3, wherein said sensing assembly includes a second annular array of circumferentially spaced-apart temperature sensors, said second annular array being located downstream of said first annular array relative to a flow direction of the gas stream.

5. A system as defined in claim 3, wherein said signal processor assembly detects the temperature sensors registering the maximum and the minimum temperatures and subsequently determines the difference of temperature existing between the minimum and maximum temperatures before comparing the computed difference value to the predetermined acceptable delta value.

6. A system as defined in claim 1, wherein said sensing unit includes a plurality of circumferentially spaced-apart radial probes, and wherein at least two radially spaced-apart temperature sensors are provided on each probe.

7. A system as defined in claim 1, wherein the sensors are positioned and arranged so as to provide a distribution profile of the temperature at an exit of a combustor section of the gas turbine engine.

8. A system as defined in claim 1, wherein said sensing assembly includes a plurality of thermocouples.

9. A system as defined in claim 1, wherein the system is provided in the form of a retrofit package adapted to be mounted to existing engines.

10. A method for monitoring the condition of a hot end component of a gas turbine engine, comprising the steps of:

a) sensing a temperature distribution in at least a portion of a gas path in a gas turbine engine, wherein said temperature distribution comprises a plurality of temperatures sensed at different locations in the gas path at a particular point in time, and b) calculating the temperature difference between a maximum temperature and a minimum temperature of the sensed temperature distribution at the particular point in time, and c) comparing said temperature difference with a predetermined delta value to detect a malfunction condition, and then, upon detection of the malfunction condition, generating a warning signal indicative that maintenance is require, wherein the warning signal is generated solely on the basis of the temperature difference.

11. A method as defined in claim 10, wherein an alert signal is generated when the computed temperature difference is greater than the predetermined delta value.

12. A method as defined in claim 11, wherein the malfunction condition corresponds to an improperly function fuel nozzle.

13. A method as defined in claim 10, wherein the temperature is sensed in a plurality of locations in a plane perpendicular to a gas path direction.

14. A method as defined in claim 10, wherein the temperature is sensed in plurality of locations in a plane parallel to a gas path direction.

15. A method as defined in claim 10, wherein the temperature is sensed between two turbine stages of the gas turbine engine.

16. A gas turbine engine comprising: a compressor section, a combustor section, a plurality of fuel nozzles for delivering pressurized fuel to the combustor section wherein the fuel is ignited for generating a stream of hot combustion gases, a turbine section for extracting energy from the combustion gases; and a combustor malfunction detection system, the system including a first set of temperature sensors located in the hot gas stream for sensing an inter-turbine temperature (ITT) distribution, and a signal processor receiving a temperature signal from each of said temperature sensors for determining a delta of temperature between minimum and maximum sensed temperatures and for generating a combustor malfunction signal when the delta of temperature is greater than a predetermined acceptable value, the signal processor being configured to generate the combustor malfunction signal solely based on the delta of temperature.

17. A gas turbine engine as defined in claim 16, wherein said first set of temperature sensors are generally equally spaced on an annular array located between two stages of turbine blades.

18. A gas turbine engine as defined in claim 16, wherein a second set of circumferentially spaced-apart temperature sensors is provided downstream of said first set.

19. A gas turbine engine as defined in claim 16, wherein said first set of temperature sensors includes a number of circumferentially spaced-apart radial probes, and wherein at least two radially spaced-apart thermocouples are mounted on each probe.

* * * * *